US005948188A

United States Patent [19]

Gibson et al.

[11] Patent Number: 5,948,188

[45] Date of Patent: Sep. 7, 1999

[54] METHOD AND APPARATUS FOR ASSEMBLING AND DELIVERING VENEER PACKET TO LAMINATED VENEER LUMBER PRESS

[75] Inventors: Peter William Gibson, Maple Ridge; Brian Rooney, Vancouver; Eric Hulme, Surrey; Adam Mleczak, Surrey; Kenneth R. Cato, Surrey, all of Canada

[73] Assignee: Raute Wood Ltd., British Columbia, Canada

[21] Appl. No.: 08/963,890

[22] Filed: Nov. 4, 1997

[51] Int. Cl.[6] .......... B32B 31/00

[52] U.S. Cl. .......... 156/64; 156/362; 156/539; 156/580

[58] Field of Search .......... 156/64, 350, 362, 156/538, 539, 580

[56] References Cited

U.S. PATENT DOCUMENTS

| | | | |
|---|---|---|---|
| 4,930,556 | 6/1990 | Prihoda | 144/347 |
| 4,931,113 | 6/1990 | Feichtmeir et al. | 156/64 |
| 5,662,760 | 9/1997 | Tsuda | 156/264 |

*Primary Examiner*—James Sells
*Attorney, Agent, or Firm*—Oyen Wiggs Green & Mutala

[57] ABSTRACT

A veneer packet assembly and delivery apparatus; and, a method of assembling a packet of veneer sheets and delivering the assembled packet for incorporation into a billet being fed into a laminated veneer lumber press. A veneer sheet is aligned atop a first series of spaced horizontal members which are then displaced downwardly by a selected thickness distance and longitudinally by a selected offset distance. Additional sheets are sequentially aligned atop the previous sheet(s) until a packet having the desired number of plys is assembled. The first members are then lowered between a second series of spaced horizontal members, to transfer the packet onto the second members. The second members and the packet are then displaced horizontally away from the first members, over the input end of the press. A third series of spaced horizontal members are then raised between the second members, to transfer the packet onto the third members. The packet is then lowered onto the input end of the press. The third members are retracted to transfer the packet onto the input end of the press. Transfer of the packet onto the input end of the press is controlled to precisely align the packet's forward end with the trailing end of a previously processed packet being transported into the press.

22 Claims, 5 Drawing Sheets

METHOD AND APPARATUS FOR ASSEMBLING AND DELIVERING VENEER PACKET TO LAMINATED VENEER LUMBER PRESS

FIELD OF THE INVENTION

This application pertains to a method and apparatus for assembling a "packet" of veneer sheets, with the sheets atop one another and having their forward and rearward ends offset lengthwise with respect to the immediately adjacent sheet(s); and, for delivering the assembled packet for incorporation into a billet being fed into a laminated veneer lumber press.

BACKGROUND OF THE INVENTION

Laminated veneer lumber ("LVL") is a structural wood composite incorporating characteristics of both plywood and sawn lumber. Like plywood, LVL is made of adhesively bonded wood veneer sheets. But, whereas plywood is cross-banded, the veneer in LVL is bonded with the grain in most sheets running parallel, similar to sawn lumber. Because any veneer defects tend to be distributed evenly in LVL, dimensional flaws characteristic of sawn lumber are minimized, resulting in improved LVL structural properties.

In LVL manufacture, the ends of the individual veneer sheets are joined by either a lap, butt or scarf joint, with the joints being staggered throughout the cross-section of the LVL "billet". Glue is applied to the opposed, outer faces of each veneer sheet, excepting the two outermost planar surfaces. The glued sheets are laid atop one another to form the billet, which is then compressed and heated, firmly bonding the veneer into a single piece of LVL having superior strength characteristics. Veneer sheets of various dimensions can be used, including four foot by eight foot sheets; three foot by six foot sheets; or, eight foot by eight foot sheets. The billet may have any desired number of plys, with 7 to 35 plys being typical.

LVL may be made in a fixed length press or in a continuous layup press. In a fixed length press the entire billet fits between a pair of opposed platens which compress and heat the billet. In a continuous layup press an endless, continuously formed billet is slowly fed between the platens by a pair of steel belts which are rotatably driven around the respective platens.

A continuous layup press cures the billet as it is fed through the press. The feeding/curing process continues until a desired length of the billet is cured. That length can then be cut off the billet for use.

Conventionally, the billet is initially formed outside the input end of the press by manually stacking glue-bearing veneer sheets atop one another, one sheet at a time. Thus, the first sheet (whose lowermost, outward surface is non-glue-bearing) is manually laid on an assembly table and the first sheet's forward edge is manually aligned against a guide rail. The guide rail is then indexed upwardly and forwardly into a new position above the first sheet and a few inches forward of the first sheet's forward edge, while the first sheet is held in a fixed position. A second glue-bearing sheet is manually laid atop the first sheet and the second sheet's forward edge is manually aligned against the guide rail. The guide rail is then indexed upwardly and forwardly again, into a new position above the second sheet and a few inches forward of the second sheet's forward edge. The process is repeated until a billet having a desired number of plys has been assembled, with the forward and rearward ends of each sheet in the billet offset lengthwise with respect to the immediately adjacent sheet(s).

The prior art process described above is cumbersome and time consuming. The press' throughput is constrained by the time required to assemble the veneer sheets and incorporate them onto the end of the billet as it is fed into the press. The present invention overcomes these disadvantages by assembling a "packet" of veneer away from the press and delivering the assembled packet ready for incorporation onto the end of the billet being fed into the press.

SUMMARY OF THE INVENTION

The invention provides a veneer packet assembly and delivery apparatus; and, a method of assembling a packet of veneer sheets and delivering the assembled packet for incorporation into a billet being fed into a laminated veneer lumber press. A veneer sheet is aligned atop a first series of spaced horizontal members which are then displaced downwardly by a selected thickness distance and longitudinally by a selected offset distance. Additional sheets are sequentially aligned atop the previous sheet(s) until a packet having the desired number of plys is assembled.

The first members are then lowered between a second series of spaced horizontal members, to transfer the packet onto the second members. The second members and the packet are then displaced horizontally away from the first members, over the input end of the press. A third series of spaced horizontal members are then raised between the second members, to transfer the packet onto the third members.

The packet is then lowered toward the input end of the press and the third members are withdrawn to transfer the packet onto the input end of the press. Transfer of the packet onto the input end of the press is controlled to precisely align the packet's forward end with the trailing end of the billet being transported into the press.

DETAILED DESCRIPTION OF THE PREFERRED EMBODIMENT

Figure 1:
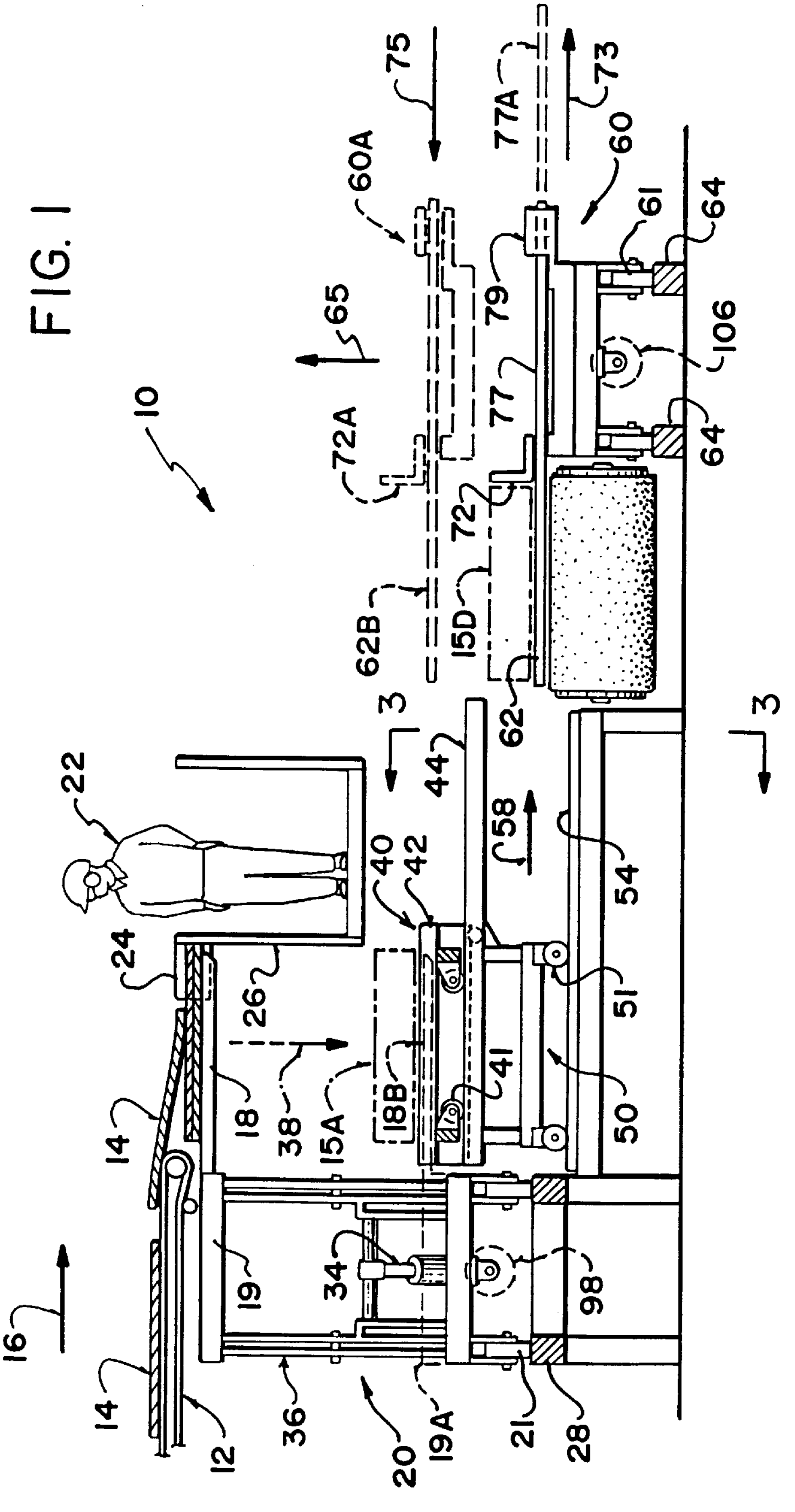
FIG. 1 is a side elevation view of a veneer packet assembly and delivery apparatus according to the invention.
Figure 2:
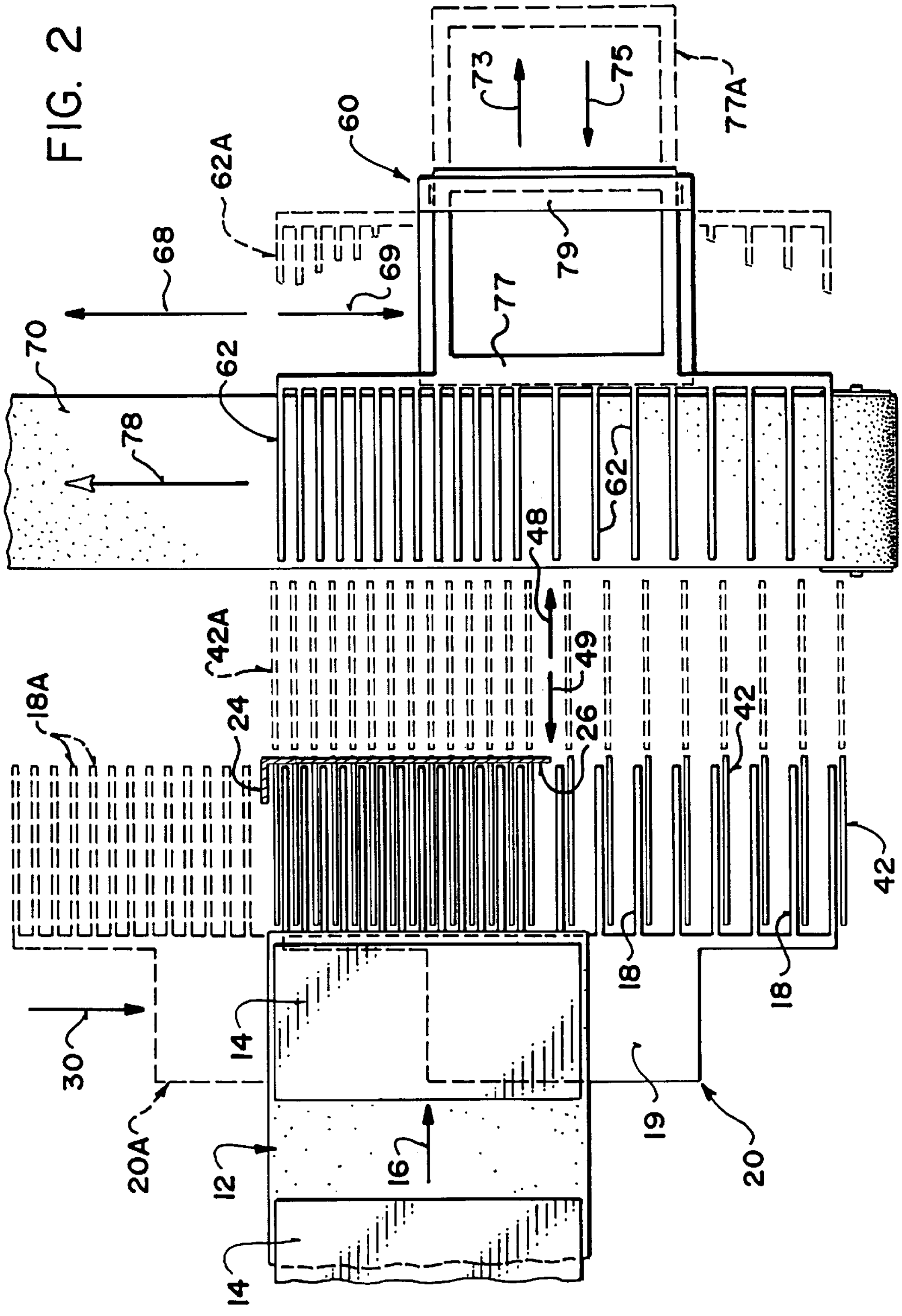
FIG. 2 is a top plan view of the FIG. 2 apparatus.

FIGS. 1 and 2 depict a veneer packet assembly and delivery apparatus generally designated 10. Veneer sheet feeder 12 sequentially feeds veneer sheets 14 in the direction of arrow 16 onto a first series of spaced horizontal bar members 18 attached to upper elevating portion 19 of first carriage 20. Sheets 14 are loaded onto feeder 12 in a predetermined order. This allows sheets of different grades to be presented in a preselected order, allows presentation of sheets with or without glue applied, presentation of sheets with grain oriented in the direction of flow or opposite thereto, etc.

Initially, carriage 20 is retracted into the dashed outline position 20A shown in FIG. 2 to place members 18 in the dashed outline position 18A; and, members 18 are initially in their fully elevated position shown in solid outline in FIG. 1.

Figure 3:
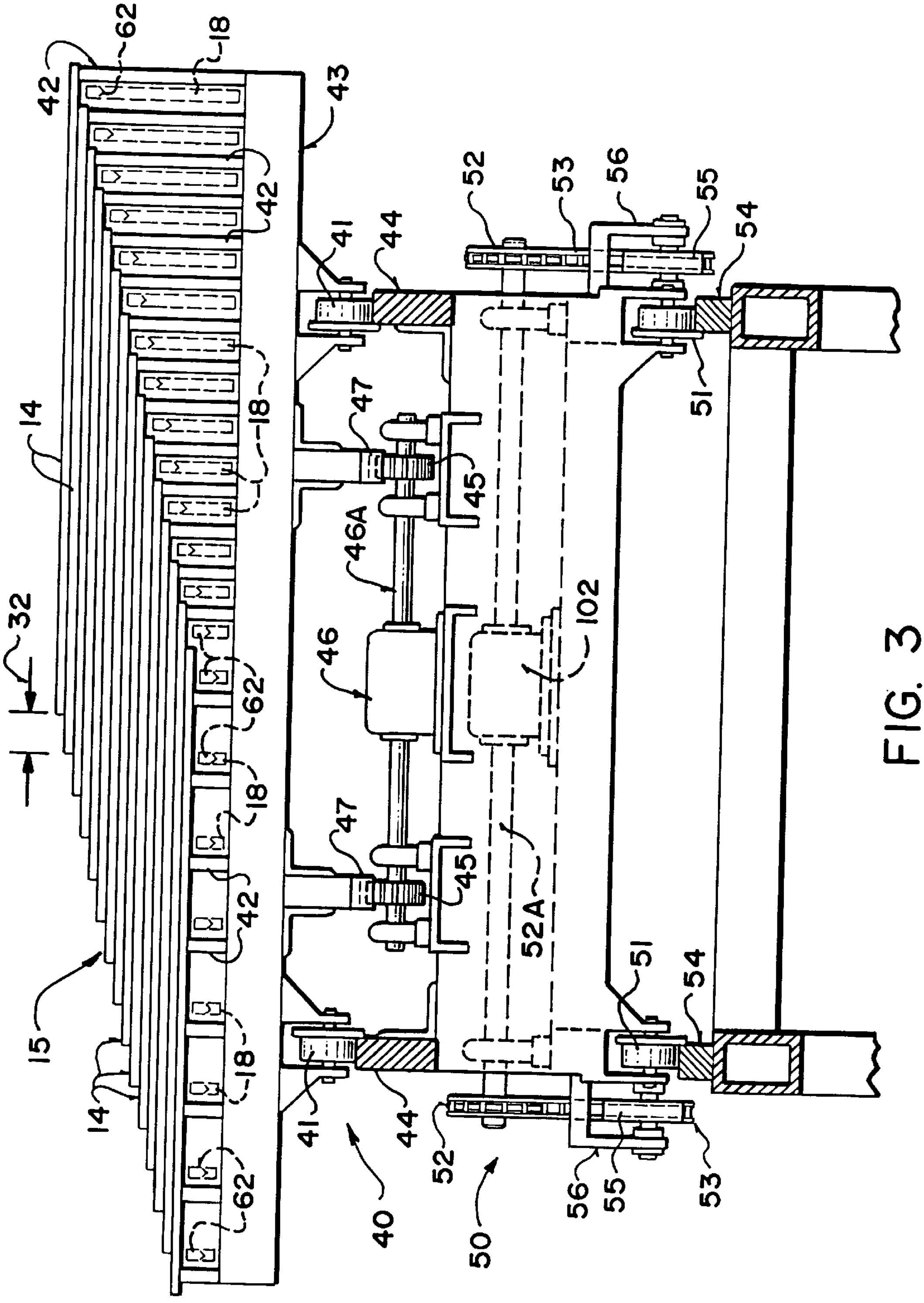
FIG. 3 is a partially sectioned view taken along line 3—3 of FIG. 1, and shows (on a scale which is greatly exaggerated in the vertical direction) a packet of veneer sheets assembled in accordance with the invention.

As each veneer sheet 14 is fed onto members 18, operator 22 aligns the end of the sheet against abutment plate 24 and aligns the sheet's outward edge against fence 26. Plate 24 and fence 26 respectively serve as forward and side reference lines for aligning sheets 14. After a short preselected time delay, a digital processor-equipped control system (hereinafter described in greater detail) is actuated to incrementally displace carriage 20 longitudinally via wheels 21 along rails 28 in the direction of arrow 30 by a selected offset distance 32 (FIG. 3). The offset distance may vary from about six inches for a fifteen ply layup to about three inches for a thirty-five ply layup. The control system simultaneously actuates a first "elevator", namely hydraulic cylinder 34, which is coupled between articulating support frame 36 and the base of carriage 20. Such actuation of cylinder 34 incrementally displaces the elevating portion 19 of first carriage 20, members 18 and the sheet(s) thereon downwardly in the direction of arrow 38 by a selected thickness distance equal to the typical thickness of one of sheets 14. Abutment plate 24 and fence 26 remain fixed in position.

The foregoing process is repeated for each sheet, until a packet 15 (FIG. 3) having the desired number of plys is assembled atop members 18. The flow of sheets along feeder 12 then stops and the control system is actuated to move carriage 20 and members 18 longitudinally in the direction of arrow 30 into the solid outline position shown in FIG. 2; and, to move members 18 and elevating portion 19 downwardly in the direction of arrow 38 into their respective dashed outline positions 18B, 19A shown in FIG. 1.

A shuttle cart 40 having a second series of spaced horizontal members 42 supported on beams 43 (FIGS. 3 and 4) is positioned for back and forth traversal via wheels 41 along rails 44, in the directions of arrows 48, 49 (i.e. perpendicular to the direction traversed by first carriage 20). Initially, shuttle cart 40 is retracted into the position shown in FIG. 1; and, members 42 are also retracted into the position shown in solid outline in FIG. 2. As indicated by arrows 48, 49 the control system can be actuated, as hereinafter explained, to extend members 42 into the dashed outline position 42A shown in FIG. 2, or to retract them as aforesaid.

Figure 4:
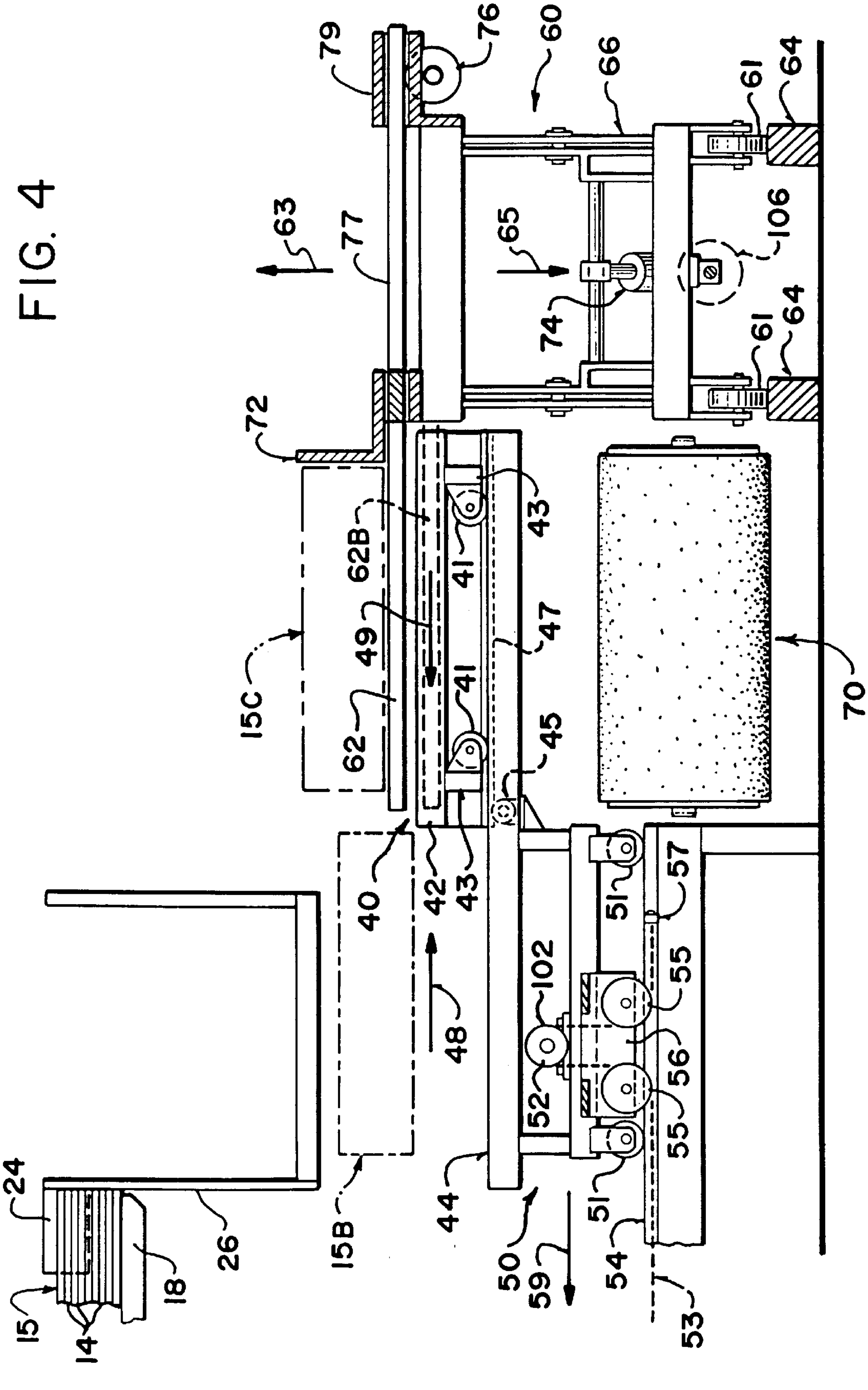
FIG. 4 is an enlarged view of the right hand portion of the FIG. 1 apparatus, showing the packet being transferred to a conveyor.

The aforementioned rails 44 are formed atop a second carriage 50 which is itself positioned for back and forth traversal via wheels 51 along rails 54, in the directions of arrows 58, 59. Referring to FIGS. 3 and 4, drive motor 102 rotatably drives axle 52A, which in turn drives sprockets 52 fixed on the opposed ends of axle 52A. Sprockets 52 drivingly engage chains 53 on each side of carriage 50. Chains 53 are entrained over idler wheels 55 which are rotatably mounted on a support frame 56 attached to carriage 50. Each opposed end of chain 53 is fixed to a stationary anchor block 57 (only one of which is shown, in FIG. 4). Anchor blocks 57 are respectively fixed near the opposed ends of each of rails 54. When motor 102 is actuated to drivingly rotate sprockets 52, carriage 50 is drawn along rails 54 on wheels 51, in the directions of arrows 58, 59 (depending upon the drive direction of motor 102).

Referring to FIG. 4, another drive motor 46 fixed atop carriage 50 rotatably drives axle 46A, which in turn drives bearing-supported gear wheels 45 fixed on the opposed ends of axle 46A. Gear wheels 45 respectively engage gear racks 47 fixed to the underside of shuttle cart 40. When motor 46 is actuated to drivingly rotate gear wheels 45, shuttle cart 40 is driven along rails 44 on wheels 41, in the directions of arrows 48, 49 (depending upon the drive direction of motor 46).

As explained above, after formation of packet 15, the control system is actuated to move carriage 20 and members 18 into the solid outline position shown in FIG. 2; and, to move members 18 down-wardly in the direction of arrow 38 into the dashed outline position 18B shown in FIG. 1. The FIG. 2 solid outline position of carriage 20 and the FIG. 1 initial positions of shuttle cart 40 and members 42 are arranged to allow members 18 to move downwardly between members 42, while members 42 remain stationary, as seen in FIGS. 2 and 3. Packet 15 is transferred from members 18 onto shuttle cart 40's members 42, once members 18 have moved beneath members 42.

It will be noted that the height of members 18, 42 varies, with the rearmost (rightmost, as viewed in FIG. 3) members being highest and the forwardmost (leftmost, as viewed in FIG. 3) members being shortest. The height difference, which is exaggerated in FIG. 3 for purposes of illustration only, is to ensure support for the rearmost portion of each of sheets 14.

Once packet 15 is transferred onto shuttle cart 40, the control system is actuated to displace carriage 50 (with cart 40 and packet 15 supported thereon) longitudinally along rails 54 in the direction of arrow 58, from the position shown in FIG. 1 to the position shown in FIG. 4. Members 42 on cart 40 are thus moved from their solid outline position shown in FIG. 2 to the dashed outline position 42A shown in the same Figure; and, packet 15 is thus moved from position 15A shown in FIG. 1 to position 15B shown in FIG. 4. As seen in FIG. 4, when carriage 50 is fully displaced in the direction of arrow 58 rails 44 project above conveyor 70. The control system is then actuated to displace cart 40 and packet 15 longitudinally along rails 44 in the direction of arrow 48, into the position shown in FIG. 4, thus positioning packet 15 above conveyor 70. Alternatively, if third carriage 60 (described below) is still handling a previously processed packet, then cart 40 and packet 15 can be displaced longitudinally along rails 44 in the direction of arrow 48, before carriage 50 is displaced along rails 54.

A third carriage 60 is positioned to traverse back and forth along rails 64 via wheels 61 as indicated by arrows 68, 69 (i.e. perpendicular to the direction traversed by carriage 50 and shuttle cart 40). Movable frame 77 mounted atop carriage 60 beneath retaining plate 79 has a series of outwardly extending bar members 62 similar to bar members 18 on first carriage 20. Initially (i.e. after removal of any previously processed packet from members 62) frame 77 and members 62 are retracted away from conveyor 70 by motor 76 into the dashed outline position 62A, 77A shown in FIG. 2; and, carriage 60 is in its fully elevated position shown in FIG. 4 (also shown as dashed outline position 60A in FIG. 1).

As previously explained, the control system is actuated to position shuttle cart 40, with packet 15 supported thereon, above conveyor 70. The control system (specifically, motor 76 on carriage 60) is then actuated to move frame 77 and members 62 in the direction indicated by arrow 75, into the solid outline position shown in FIG. 2. This positions members 62 between members 42, in the dashed outline position 62B shown in FIG. 3. (Members 18 and 62 are shown in dashed outline in FIG. 3 because they are never simultaneously present between members 42.) The control system simultaneously actuates a second "elevator", namely hydraulic cylinder 74 (FIG. 4), which is coupled between articulating support frame 66 and the base of carriage 60. Such actuation of cylinder 74 displaces frame 77 and members 62 upwardly in the direction of arrow 63. Members 42 remain stationary while members 62 move upwardly. Packet 15 is accordingly transferred from members 42 onto members 62, as shown at 15C, once members 62 have moved above members 42. Once packet 15 is transferred onto members 62, the control system is actuated to retract shuttle cart 40 and carriage 50 in the direction of arrows 49, 59 into their respective initial positions for receipt of another packet.

With packet 15 supported on members 62 as seen at 15C in FIG. 4, the control system is actuated to displace carriage 60 longitudinally in the direction of arrow 68. The operator may intervene to controllably advance or retard the speed and/or position of carriage 60 in order to precisely align the leading end of packet 15 (i.e. the end thereof which is away from the viewer, as viewed in FIG. 4) with the rearward end of any previously processed packet being transported by conveyor 70 in the throughput processing direction indicated by arrow 78. Once proper alignment is attained, the control system is actuated to match the speed of carriage 60 to the speed of conveyor 70. If conveyor 70 is not transporting a previously processed packet, then packet 15 can be fed directly into the press (not shown) to form the lead portion of a new billet. Otherwise, packet 15 is incorporated onto the end of the previously processed packet to form a continuous billet.

Once proper alignment is attained, the control system actuates the second elevator on carriage 60 to lower members 62 and packet 15 downwardly in the direction of arrow 65 toward conveyor 70. This moves members 62 and frame 77 from their dashed outline positions shown in FIG. 1 to their solid outline positions shown in the same Figure; and, places the packet in position 15D. A pressure roller (not shown) is simultaneously lowered onto the top of any previously processed packet being transported by conveyor 70, to stabilize that packet and to aid in aligning the height of the respective packets. When members 62 reach their lowest point of descent above the surface of conveyor 70, the control system is actuated to retract frame 77 and members 62 away from conveyor 70 in the direction of arrow 73. Fence 72 fixed atop carriage 60 strips packet 15 off members 62 onto conveyor 70 as frame 77 and members 62 are retracted as aforesaid.

After members 62 are fully retracted into the dashed outline position 62A shown in FIG. 2, the control system is actuated as aforesaid to move members 62 in the upward direction indicated by arrow 65. Once members 62 are elevated above the top surface of packet 15, the control system is actuated to extend members 62 over conveyor 70 in the direction of arrow 75; and, to displace carriage 60 longitudinally in the direction of arrow 69 (i.e. downwardly, as viewed in FIG. 2) to return carriage 60 to its initial position shown in solid outline in FIG. 4.

Figure 5:
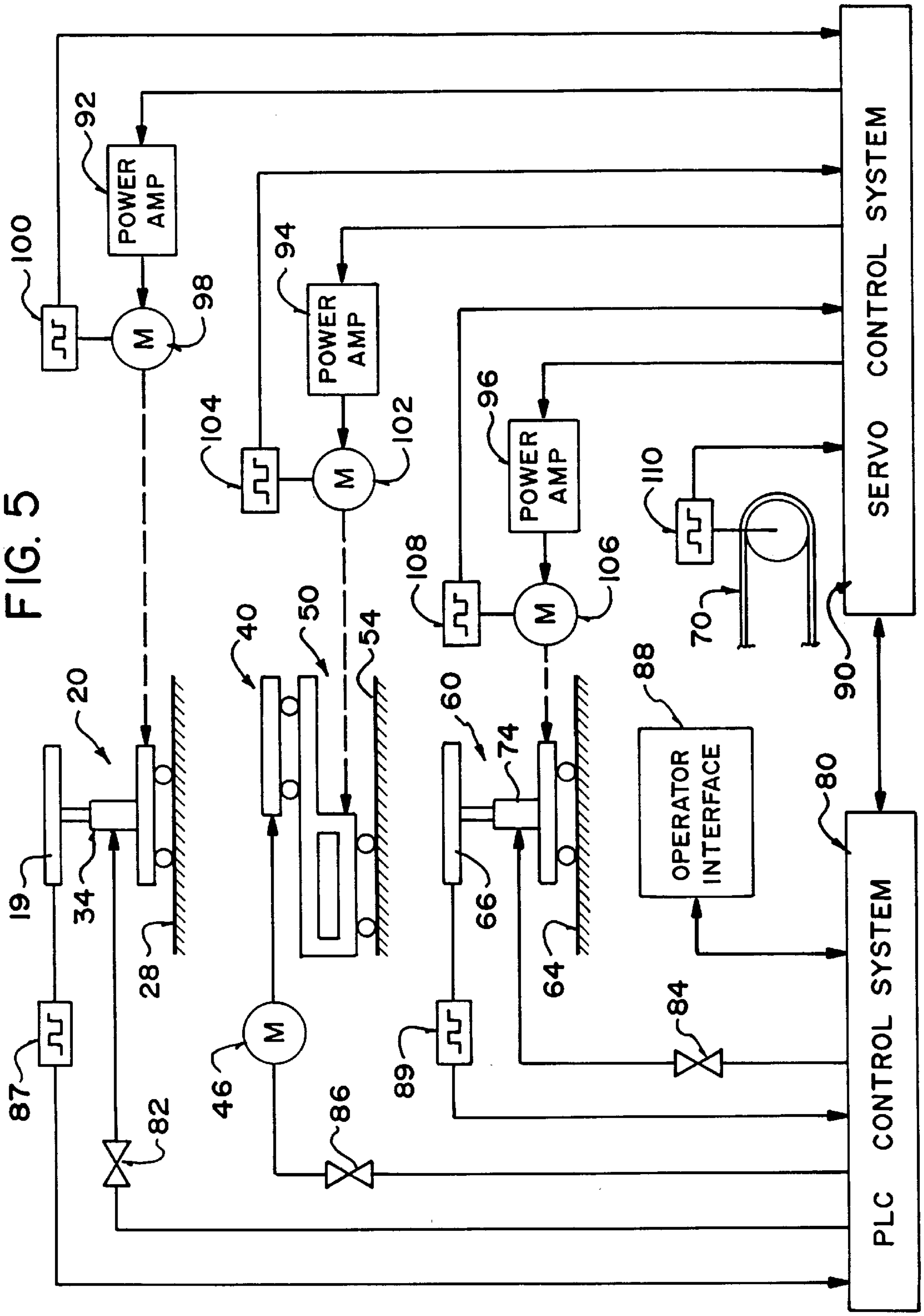
FIG. 5 is a schematic diagram of a control system for controlling the operation of the FIG. 1 apparatus.

FIG. 5 schematically depicts a control system for controlling the above-described operation of apparatus 10. A suitably programmed programmable logic controller ("PLC") 80 is provided for controllably actuating hydraulic valves 82, 84, 86 which are respectively coupled to hydraulic cylinders 34, 74 (on carriages 20, 60 respectively) and to hydraulic motor 46, which is mounted on carriage 50 to extend and retract shuttle cart 40 as previously explained. Operator 22 interacts with the control system via operator interface 88, which is electronically coupled to programmable logic controller 80. An electronic tachometer 87 coupled to the upper elevating portion 19 of first carriage 20 (and thus to the rod of hydraulic cylinder 34) outputs a feedback signal which programmable logic controller 80 uses to determine the height of members 18. An electronic tachometer 89 coupled to the articulating support frame 66 of third carriage 60 (and thus to the rod of hydraulic cylinder 74) similarly outputs a feedback signal which programmable logic controller 80 uses to determine the height of members 62.

Programmable logic controller 80 communicates electronically with servo control system 90, which in turn controllably actuates power amplifiers 92, 94 and 96. Amplifier 92 drives electric motor 98 which is coupled to carriage 20 to incrementally displace carriage 20 along rails 28 as previously explained. An electronic tachometer 100 attached to motor 98 outputs a feedback signal which servo control system 90 uses to determine the position of carriage 20. Amplifier 94 drives electric motor 102 which is mounted on carriage 50 to displace carriage 50 along rails 54 as previously explained. An electronic tachometer 104 attached to motor 102 outputs a feedback signal which servo control system 90 uses to determine the position of carriage 50. Amplifier 96 drives electric motor 106 which is coupled to carriage 60 to displace carriage 60 along rails 64 as previously explained. An electronic tachometer 108 attached to motor 106 outputs a feedback signal which servo control system 90 uses to determine the position of carriage 60. An electronic tachometer 110 coupled to conveyor 70 outputs a feedback signal which servo control system 90 uses to determine the speed and position of conveyor 70.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of assembling a packet of veneer sheets and delivering the assembled packet for incorporation into a billet being fed into a laminated veneer lumber press, said method comprising the steps of:

(a) aligning a first veneer sheet atop a first series of spaced horizontal members;

(b) displacing said first series of horizontal members and said sheet(s) downwardly by a selected thickness distance and longitudinally by a selected offset distance;

(c) aligning another veneer sheet atop said previously aligned veneer sheet(s) and repeating said step (b);

(d) repeating said step (c) until a packet consisting of a selected number of said veneer sheets is assembled atop said first series of spaced horizontal members;

(e) displacing said first series of horizontal members downwardly between a second series of spaced horizontal members, thereby transferring said packet onto said second series of horizontal members;

(f) displacing said second series of horizontal members and said packet horizontally away from said first series of horizontal members into a position over an input end of said laminated veneer lumber press;

(g) displacing a third series of horizontal members upwardly between said second series of horizontal members to transfer said packet onto said third series of horizontal members;

(h) displacing said third series of horizontal members and said packet downwardly toward said input end of said laminated veneer lumber press; and, (i) withdrawing said third series of horizontal members from beneath said packet, thereby transferring said packet onto said input end of said laminated veneer lumber press.

2. A method as defined in claim 1, wherein said veneer sheet aligning steps respectively comprise aligning a side edge and a forward edge of said veneer sheet relative to side and forward reference lines respectively.

3. A method as defined in claim 2, wherein said reference lines are fixed with respect to said first series of horizontal members.

4. A method as defined in claim 3, wherein said selected offset distance further comprises a longitudinal displacement relative to said forward reference line.

5. A method as defined in claim 1, further comprising, after said transferring of said packet onto said second series of horizontal members, the further steps of:

(a) displacing said first series of horizontal members upwardly and longitudinally to return said first series of horizontal members to an initial position of said first series of horizontal members; and, (b) repeating said method, commencing with said step 1(*a*).

6. A method as defined in claim 5, further comprising after said transferring of said packet onto said third series of horizontal members, the further step of displacing said second series of horizontal members into an initial position of said second series of horizontal members, beneath said first series of spaced horizontal members.

7. A method as defined in claim 6, further comprising, after said transferring of said packet onto said input end of said laminated veneer lumber press, the further step of displacing said third series of horizontal members into an initial position of said third series of horizontal members, above and to one side of said input end of said laminated veneer lumber press.

8. Apparatus for assembling a packet of veneer sheets and delivering the assembled packet for incorporation into a billet being fed into a laminated veneer lumber press, said apparatus comprising:

(a) a first carriage having a first series of spaced horizontal members;

(b) a shuttle cart having a second series of spaced horizontal members;

(c) a second carriage for supporting said shuttle cart;

(d) a third carriage having a third series of spaced horizontal members;

(e) a first elevator coupled between said first carriage and said first series of spaced horizontal members for vertically displacing said first series of horizontal members; and, (f) a second elevator coupled between said third carriage and said third series of spaced horizontal members for vertically displacing said third series of horizontal members;

wherein said shuttle cart is horizontally displaceable atop said second carriage, to alternately position said second series of spaced horizontal members between said first series of spaced horizontal members and between said third series of spaced horizontal members.

9. Apparatus as defined in claim 8, wherein:

(a) said first and third carriages are displaceable in a direction parallel to a throughput processing direction of said laminated veneer lumber press; and, (b) said second carriage and said shuttle cart are displaceable between said first and third carriages in a direction perpendicular to said throughput processing direction.

10. Apparatus as defined in claim 9, further comprising a veneer sheet feeder for sequentially feeding veneer sheets onto said first series of spaced horizontal members.

11. Apparatus as defined in claim 9, wherein said third series of spaced horizontal members is horizontally displaceable relative to an input end of said laminated veneer lumber press.

12. Apparatus as defined in claim 9, further comprising a digital processor for controlling independent, incremental displacement of:

(a) said first and third carriages in said direction parallel to said throughput processing direction; and, (b) said shuttle cart in said direction perpendicular to said throughput processing direction.

13. Apparatus as defined in claim 9, further comprising first drive means coupled between said shuttle cart and said second carriage for horizontally displacing said shuttle cart atop said second carriage.

14. Apparatus as defined in claim 13, wherein said first drive means further comprises a first drive motor mounted on said second carriage, said first drive motor drivingly rotating a first axle, a gear wheel fixed on said first axle, said gear wheel engaging a gear rack mounted on said shuttle cart.

15. Apparatus as defined in claim 9, further comprising second drive means couple to said second carriage for displacing said second carriage between said first and third carriages.

16. Apparatus as defined in claim 15, wherein said second drive means further comprises a second drive motor mounted on said second carriage, said second drive motor drivingly rotating a second axle, a drive sprocket fixed on said second axle, said drive sprocket engaging a chain fixed between opposed, stationary anchors.

17. Apparatus as defined in claim 10, wherein:

(a) said first carriage has an initial position relative to said sheet feeder;

(b) said second carriage and said shuttle cart have initial positions below said first series of spaced horizontal members; and, (c) said third carriage has an initial position horizontally aligning said third series of spaced horizontal members with said second series of spaced horizontal members when said shuttle cart is displaced toward said third carriage.

18. Apparatus as defined in claim 12, wherein said digital processor is further for controlling independent, incremental displacement of said first and second elevators respectively.

19. Apparatus as defined in claim 12, wherein said digital processor is further for controlling independent, incremental displacement of said first and second elevators respectively, to vertically displace said first series of spaced horizontal members between said second series of spaced horizontal members and to vertically displace said third series of spaced horizontal members between said second series of spaced horizontal members.

20. Apparatus as defined in claim 12, wherein said digital processor is further for controlling:

(a) incremental displacement of said first elevator downwardly by a selected thickness distance; and, (b) incremental displacement of said first carriage longitudinally by a selected offset distance.

21. Apparatus as defined in claim 13, wherein said digital processor is further for controllably actuating said first drive means to displace said shuttle cart atop said second carriage.

22. Apparatus as defined in claim 15, wherein said digital processor is further for controllably actuating said second drive means to displace said second carriage between said first and third carriages.

* * * * *